Figure 1:
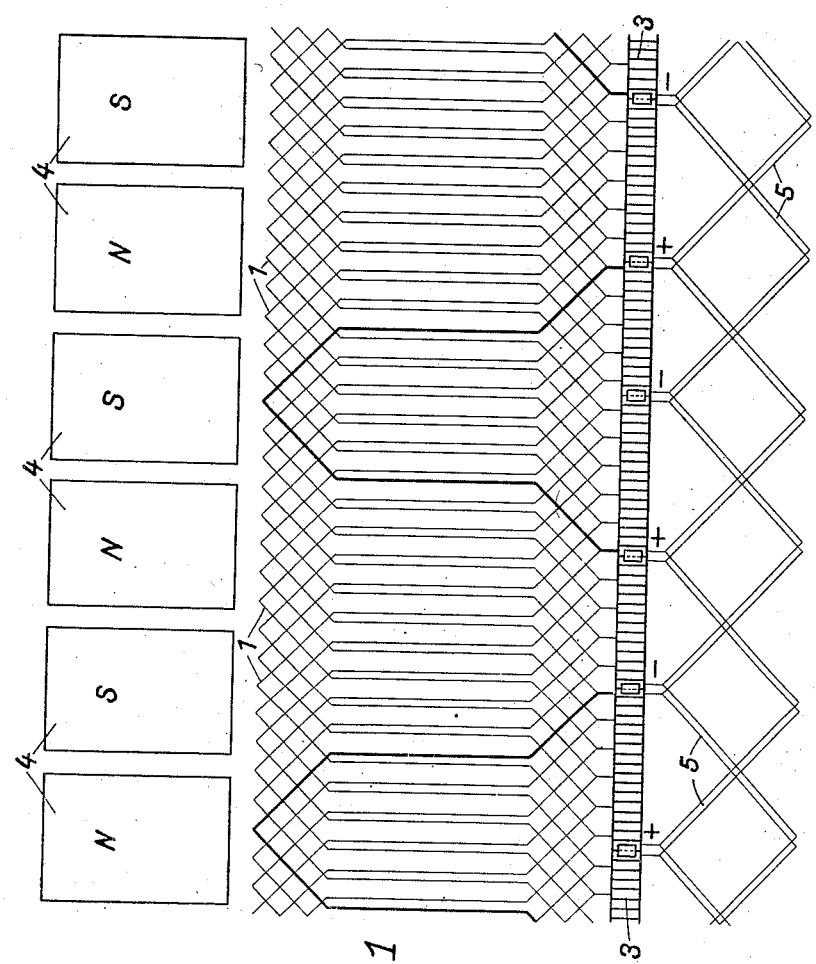

Patented Nov. 29, 1938

2,138,417

UNITED STATES PATENT OFFICE

2,138,417

ARRANGEMENT FOR AVOIDING THE DISTURBANCES ATTENDANT ON THE TRANSFORMER POTENTIAL IN ALTERNATING CURRENT COLLECTOR MOTORS

Walter Dällenbach, Berlin-Charlottenburg, and Georg Leischner, Berlin-Schmochwitz, Germany, assignors to N. V. Machinerieen en Apparaten Fabrieken "Meaf." Utrecht, Netherlands Application August 28, 1935, Serial No. 38,290
In Germany September 1, 1934

9 Claims. (Cl. 171—228)

The present invention relates to alternating current commutator machines, particularly although not essentially alternating current commutator motors.

With the use of a direct current armature in a stator energized with alternating current, the well known difficulty occurs that in addition to the desired potential producing movement (i. e., the electromotive force effecting the rotation) the so-called transformer potential is also induced. This transformer potential induced in the armature windings has generally maximum value when the windings of the armature are short-circuited by the brushes and at the moment when the current reverses and causes a burning of the brushes and considerable wear thereof and of the commutator. To overcome these disadvantages, it has already been proposed:

1. To reduce the periodicity from 50 cycles to 16⅔ cycles, for example, the drawbacks of which are obvious.

2. To reduce the potential between adjacent commutator bars, by means of tappings carried outside the armature iron, to half the winding potential, for example. This arrangement is undoubtedly an improvement, but no actual remedy, since there is still induced in a half winding a harmful short-circuit current.

3. To connect a resistance between the armature winding and the commutator,—thereby causing considerable losses.

4. To connect ohmic resistances in parallel to the reversing poles in order to induce in the current reversing winding a supplementary potential producing movement which is of suitable phase and also counteracts the transformer potential of the stator field. This solution also involves considerable losses and has, furthermore, the fundamental drawback that the potential necessary for the current reversal is only produced when the armature is rotating, whereas the transformer potential which causes the sparking at the brushes is already present when the armature is at rest.

The present invention has for its object alternating current commutator machines, wherein means are provided offering a solution of the problem above described which is of a fundamentally different character to the solutions hitherto proposed, and which permit the construction even of large units for the usual periodicity of 50 cycles, while obviating the disturbances hitherto due to the transformer potential.

The invention is based on the consideration that if the alternating flux produced by a primary winding, e. g., of a transformer, is only partially linked with a secondary winding of the transformer to such an extent for example that only one-quarter of the alternating flux produced by the primary winding passes through secondary winding, whilst three-quarters thereof traverse a magnetic circuit which is not enclosed by the secondary winding, it is possible to short-circuit this secondary winding without producing harmful short-circuit currents, and this simply because by the short-circuiting of the secondary winding the partial flux passing therethrough (before the occurrence of the short-circuit) is displaced so that the short-circuited secondary winding is not traversed by any appreciable flux at all. The potential induced therein is consequently practically zero. The current path of the secondary winding can thus be broken without producing an arc harmful to the switch. It is essential for the so-called flux displacement that care must be taken to ensure that the flux-paths, for example iron paths, to which the partial flux is to be displaced, are such that they are capable of taking in the desired manner the said partial flux. Consequently, the partial flux which is to be displaced and the saturation conditions, such as the number and area, of the flux-paths to which the said partial flux is to be displaced, must be correspondingly dimensioned.

The invention consists in the use in alternating current commutator machines, and in particular although not essentially on alternating current commutator motors, of the principle of flux displacement above referred to. According to the invention, in order to avoid the sparking at the brushes caused by the transformer potential, a flux displacement is effected on the short-circuiting of a current path by a brush, in such a manner that the partial flux of the short-circuited path is displaced on to a second magnetic path which is not included in the current path which has been short-circuited.

A specific object of the invention therefore consists in the provision of an alternating current commutator machine, and in particular an alternating current commutator motor, comprising means whereby at any time only a part of the alternating flux linked with a branch of the exciting winding of the machine flows through current paths of the armature winding which are momentarily short-circuited by brushes at the moment of current reversal in the said paths, and the said partial flux is displaced at the moment of the said short-circuiting.

The expression "alternating flux which is linked with a branch of the exciting winding", means the alternating flux which is produced by an exciting winding of the machine which represents a single current path or a portion thereof. An alternating flux which, for example, is produced by two or more branches of the exciting circuit connected in parallel to a common source of potential, is to be regarded for the purpose of the present invention not as a single flux but as being subdivided into two or more alternating fluxes each of which is produced by a branch of the exciting winding which represents a single current path. The subdivision of the alternating flux linked with a branch of the exciting winding into partial fluxes, can take place by the natural subdivision of the alternating flux over different iron parts of the armature or by special subdivision.

In a machine constructed in accordance with the invention, when the armature is stationary or only running slowly (starting), there will flow in the current paths at the moment of the current reversal and which are momentarily short-circuited by the brushes of the machine, a current which displaces the partial alternating flux which traversed the current path before the short-circuiting, so that practically no potential is induced in the short-circuited current path. Consequently, the opening of this current path by the commutator takes place without harmful strain on the brushes and commutator. In the case of a rapidly running armature and finally at working speed and consequently with very short switch duration, the desired result can also be obtained by means of the present invention. That is, by the provision of a second path for the flux the current in the short-circuited current path can be reduced in the desired manner and the commutation can proceed substantially without sparking.

Alternating current commutator machines may be constructed in various ways in accordance with the invention. The different possibilities may be first arranged according to the direction relatively to the armature in which is displaced the partial flux which traverses, before the short-circuiting, the current paths of the armature winding short-circuited by the brushes. According to the invention the displacement of this partial flux can take place in the peripheral, axial or radial direction. The construction employed depends partly upon the conditions of the individual case and also upon whether a drum armature or a ring armature is to be used. The same holds good with respect to the subdivision of the magnetic flux linked with the exciting winding of the machine. This can also take place in the axial, radial or peripheral direction. Preferably, there is effected according to the invention the subdivision of the alternating flux at each pole.

In the case of drum armatures, the partial alternating flux occurring in the armature which is linked with a branch of the exciting winding of the machine, is preferably displaced in the direction of the armature circumference, that is, in the peripheral direction. In the case of a machine with four or more poles, the total flux of a pole or of a pair of poles, in particular of two diametrically opposite poles, can be displaced in the peripheral direction on to the other poles. According to a further development of the invention, the partial alternating flux is displaced at each pole in the peripheral direction on to the driving surface of the other alternating flux of this pole. According as to whether the current paths short-circuited at the same instant by the brushes of the machine are located under one or more or all the poles of the machine, this displacement of a partial flux takes place under the one or the several or under all the poles of the machine.

Instead of the peripheral displacement in the case of a drum armature and a suitable construction of the armature winding (e. g., by circuit connections in the armature iron being effected along the circumference) an axial displacement of the partial fluxes can be effected. These arrangements are not so favourable as those involving the primary displacement of the flux in that the iron armature can no longer be made in a simple manner as in the case of the direct current armature. The armature iron must be subdivided in the axial direction and slots must be provided along the circumference for taking the separate circuit connections. On the other hand, however, the arrangement involving the axial displacement of the flux, or of the partial flux, has the advantage that the flux displacement on to a particularly favourable flux path can be effected in a simple manner.

In many cases, it is of advantage according to the invention to use a ring armature in place of a drum armature. In this case, according to the invention, the construction of the machine is preferably such that only one part of the alternating flux linked with a branch of the exciting winding of the machine and produced by axial or radial subdivision, and in particular of the alternating flux at each pole, flows through current paths of the winding of the ring armature which are momentarily short-circuited by brushes of the machine and is displaced in the axial or radial direction. Whereas a peripheral displacement of the flux is then not effected in the case of the ring armature, the axial displacement of the flux can be carried out in the same way as with the drum armature. In many respects, also, the radial displacement of the flux offers peculiar advantages with the ring armature. It permits in a particularly simple manner the displacement of the flux on to a desired favourable flux path. It is naturally within the scope of the invention to combine with each other the various possibilities of carrying out the flux displacement according to the invention.

By way of example, the invention may be carried into practice in the following manner:

Let a machine be taken with at least $p=2$ pairs of poles. The exciting windings of the individual poles being connected in series, there will thus be but a single branch producing the total exciting flux connected to the source of potential for the field excitation. The armature carries a simple lap winding and has therefore $p$ pairs of armature branches connected in parallel. In order that this machine, whether as motor or as generator, operates in accordance with the present invention, it is sufficient to give the commutator bars, of which each one is connected with a coil of the lap winding, a width which amounts to at least $p$-times the width of the brushes. If then the brushes, differing in length from that of a pole arc, are so staggered with respect to each other that at any instant only one brush, or only two brushes appertaining to one pair of poles, and in particular to two diametrically opposite poles, short-circuits adjacent bars, then the total flux of this one pole or pair of poles will be displaced on to the other poles in accordance with the present invention. It is naturally also possible with machines having a large number of poles, to employ any desired sequence considered as favourable and also regularity of the poles linked with current reversing coils. The simultaneous displacement of the flux of diametrically opposite poles is advisable in order to avoid unbalance in the field distribution and thus a one-sided magnetic pull on the armature shaft.

In order that the invention may be more clearly understood, various embodiments thereof are described hereinafter by way of example, with reference to the accompanying drawings, in which:—

Figure 2:
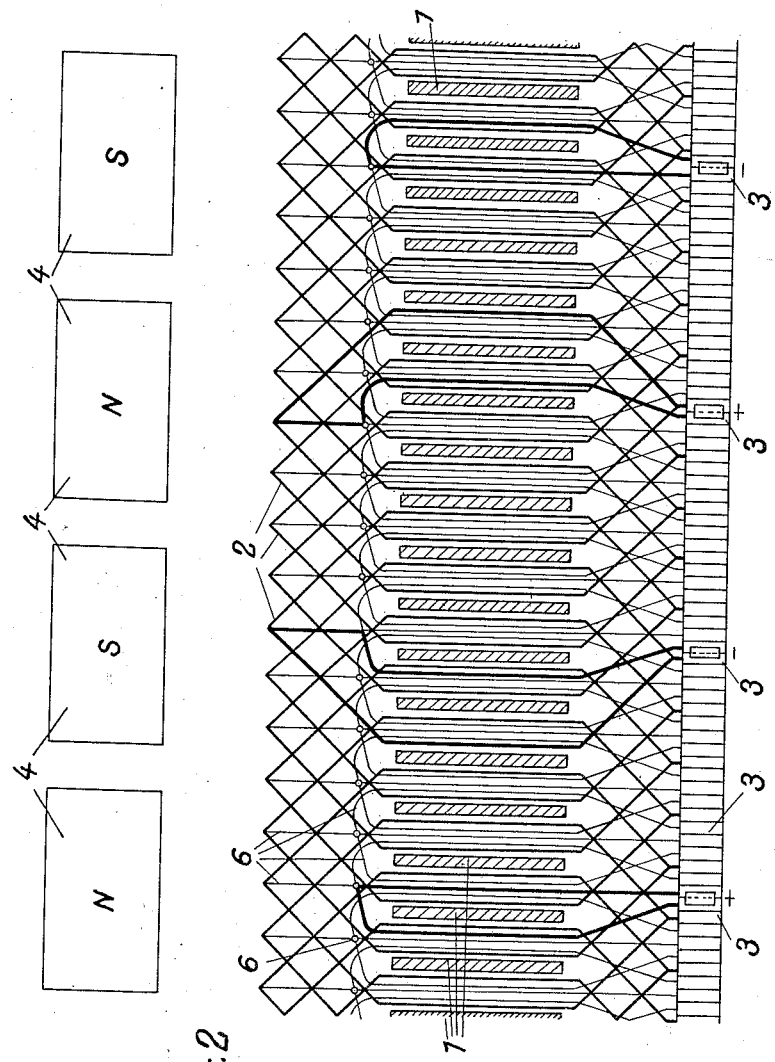

Fig. 1 is a diagrammatic view of one form of the invention showing the ring connections for the commutator bars, and Fig. 2 is a similar view of the form of the invention involving the use of top leads.

With reference to the drawings: the teeth of the armature are indicated by 1, the main armature winding by 2, the commutator by 3, the inducing poles by 4, the ring connections between the collector bars by 5, and the tappings of the main winding representing a shunt winding by 6.

The data of the embodiment illustrated in Figure 1 are as follows:

| | |
|---|---|
| Number of pairs of poles | $p=3$ |
| Number of slots | 31 |
| Simplex wave winding number of coil sides | 62 |
| Winding pitch | 5 |
| Connection pitch | 5 |
| Number of commutator bars | 93 |
| Number of ring connections | 31 |

In addition to the 31 bars which are connected in the usual way with the ends of the wave winding (main bars) there are provided in the commutator 3, between each two adjacent main bars, $p-1=2$ further bars so that the number of bars is increased to $p$-fold. Of these 93 bars, each three, which form a regular polygon of $p$ sides that is, a regular triangle, are connected together by the ring connections 5. Such ring connections, of which two are shown in Figure 1, are therefore 31 in number. As a result, each main bar is connected with two subsidiary bars. Any two adjacent bars thereby obtain transformer potentials which are induced by the flux of only one pole, whilst the transformer potential between adjacent main bars is induced by the flux of $p$-poles, that is, in the present case, of 3 poles. Therefore, upon the occurrence of a short-circuit of any 2 adjacent bars, only the flux enclosed by a single wave of the wave winding is displaced on to the armature iron located outside this wave. With a suitable arrangement of the brushes—the distance apart of the brushes amounts alternately to 17 or 14 bar widths—the fluxes under two diametrically opposite poles are displaced on to the other poles of the arrangement, assuming that the width of the brushes coincides approximately with the width of the bars, so that a brush never short-circuits more than two bars. In Figure 1 the position of the brushes corresponds exactly to the middle of the interval of a current reversal and the waves short-circuited are shown by a thicker line. Of the ring connections 5 between main and subsidiary bars, only those are shown which, with this position of the brushes, are employed for current conduction. The bar winding can, without any other alteration, be replaced by a coil winding. With the exception of the ring connections 5, it is not necessary to add anything to the winding of the ordinary armature. This appears to be a particular advantage of the wave winding, which hitherto has hardly been possible in alternating current collector machines.

The data for the embodiment according to Figure 2 are as follows:

| | |
|---|---|
| Number of pairs of poles | $p=2$ |
| Number of slots | 19 |
| Simplex lap winding with number of coil sides | 38 |
| Winding pitch | 4 |
| Connection pitch as is usual | 1 |
| Number of partial fluxes per loop | $q=4$ |
| Number of tappings per loop | $q-1=3$ |
| Number of commutator bars | 76 |

Due to the loop enclosing four teeth, there results a natural subdivision of the alternating flux passing through the loops into four partial fluxes. This natural subdivision of the flux can be utilized in accordance with the present invention by means of three tappings 6 starting from each centre of the loop, on the remote side to the commutator, which tappings are carried through the grooves within the loop but not yet taken up by their two bars, as a subsidiary winding. The subsidiary winding can be embedded in the slots above or below the main winding. These tappings are each connected to a subsidiary commutator bar located between the two main bars of the loop. If now the loop encloses the flux of four teeth, the flux of only one tooth is enclosed by the current path located between two adjacent commutator bars. Consequently, when there is a short-circuit of adjacent bars, only the flux of one tooth will be displaced on to the other tooth. In Figure 2, the brushes are shown in a position which corresponds to the centre of an interval of a current reversal. The momentarily short-circuited current paths of the armature, at the moment of current reversal, are shown by the thick lines. The width of the brushes is again substantially the same as that of a commutator bar. The distance between the brushes corresponds to the width of the poles, but it is quite possible to position the brushes, in the same way as shown in Figure 1, at distances apart differing from a pole width, so that for example, with all four brushes, at the same instant the fluxes of the first, then of the second, then of the third, and finally of the fourth tooth of the loops which are in the condition of current reversal, are progressively displaced. It is preferably an object, also in this case, to avoid unsymmetrical field distribution, which can exert a magnetic pull on the armature shaft. If instead of being subdivided into 4 partial fluxes, the flux per loop is subdivided more generally into $q$ partial fluxes, then there must be inserted between two adjacent main commutator bars $q-1$ subsidiary bars.

The principles which are involved in the invention as described are equally applicable to machines having reversing poles. Also, the structures shown in Figs. 1 and 2 can be combined in whole or in part in order to carry out the objects of the invention.

The principle according to the invention may be used in the same way for generators, motors or phase shifters. It is advantageous both for the so-called series motor (series-shunt motor) and for the repulsion motor or the Winter-Eichberg-Latour motor. The application to a higher number of phases, for example to three-phase machines, is also within the scope of the invention. The various embodiments shown in the figures can in known manner be combined with a compensation winding for counteracting the armature field, naturally assuming that this compensation winding, as has been mentioned for the field winding, encloses in the same way simple current branches which are linked in such manner with the alternating flux that they permit the displacement of partial fluxes in accordance with the invention.

What I claim and desire to secure by Letters Patent of the United States is:—

1. In an alternating current commutator machine, a stator having windings producing magnetic flux paths, a rotor having a plurality of conductors, first means for electrically interconnecting said conductors providing first current paths, second means electrically interconnected with said first current paths providing current commutating paths, the flux produced by said flux paths normally interlinking all of said current paths, and third means simultaneously conducting current to said first current paths and short circuiting said commutating paths at the instant of current reversal in conductors undergoing commutation, said short circuited commutating paths interlinking a portion only of the total amount of the said flux produced by said flux paths interlinked with the current paths, said flux normally interlinking said commutating paths being displaced at that instant upon the flux interlinked only with non-short circuited paths.

2. A machine as in claim 1, said first means comprising main commutator bars, and said second means comprising a plurality of auxiliary commutator bars interposed between said main bars and means electrically interconnecting certain of said first-named bars with certain of said auxiliary bars.

3. A machine as in claim 1, said first means comprising main commutator bars, and said second means comprising a plurality of auxiliary commutator bars interposed between said main bars, means electrically interconnecting certain of said first-named bars with certain of said auxiliary bars, and said third means comprising brushes staggered with respect to the number of bars therebetween.

4. A machine as in claim 1, said first means comprising main commutator bars, and said second means comprising a plurality of auxiliary commutator bars interposed between said main bars and second windings electrically interconnecting certain of said bars, and said third means comprising brushes non-uniformly pitched from each other, with respect to the number of bars therebetween and with respect to the windings interconnecting said bars by a distance allowing commutation to take place in less than the total number of said current paths at any instant of time.

5. A machine as in claim 1, said first means comprising main commutator bars, and said second means comprising a plurality of auxiliary bars interposed between said main bars, ring windings connecting certain of said auxiliary bars with certain of said first-named bars, and said third means comprising brushes staggered with respect to the connections between said ring windings and said bars to cause said short-circuiting of said commutating paths.

6. A machine as in claim 1, said first means comprising main commutating bars, and said second means comprising auxiliary bars interposed between said main bars, tap leads connecting said rotor conductors with said auxiliary bars, each of said tap leads forming with its rotor conductor a current path, and each of said brushes having a width not greater than the width of one of said bars.

7. A machine as in claim 1, said first means comprising main commutating bars, and said second means comprising auxiliary bars interposed between said main bars, tap leads connecting said rotor conductors with said auxiliary bars, each of said tap leads forming with its rotor conductor a current path, said auxiliary bars having a width substantially equal to said first-named bars, and each of said brushes having a width not greater than the width of one of said bars.

8. A machine as in claim 1, said rotor conductors comprising lap windings and said first means comprising main commutator bars, and said second means comprising auxiliary bars interposed between said main bars, tap leads connecting said lap windings with said auxiliary bars, each of said tap leads forming with its lap winding a current path, said auxiliary bars having a width substantially equal to said first-named bars, and each of said brushes having a width not greater than the width of one of said bars.

9. In an alternating current commutator machine, a stator having windings producing magnetic flux paths, a rotor having a plurality of conductors, means including main commutator bars for electrically interconnecting said conductors providing first current paths, means including auxiliary commutator bars interposed between said main bars electrically interconnected with said first current commutating paths, the flux produced by said flux paths normally interlinking all of said current paths, and means including brushes having a width not greater than the width of one commutator bar simultaneously conducting current to said first current paths and short circuiting said commutating paths at the instant of current reversal in conductors undergoing commutation, said short circuited commutating paths interlinking a portion only of the total amount of the said flux produced by said flux paths interlinked with the current paths, said flux normally interlinking said commutating paths being displaced at that instant upon the flux interlinked only with non-short circuited paths.

WALTER DÄLLENBACH.
GEORG LEISCHNER.